(12) United States Patent
Geliot et al.

(10) Patent No.: US 11,111,027 B2
(45) Date of Patent: Sep. 7, 2021

(54) AIRCRAFT COMPRISING AT LEAST ONE COWLING EQUIPPED WITH AN IMPROVED HINGE SYSTEM

(71) Applicant: Airbus Operations SAS, Toulouse (FR)

(72) Inventors: Jean Geliot, Toulouse (FR); Adeline Soulie, Verdun sur Garonne (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 193 days.

(21) Appl. No.: 16/415,356

(22) Filed: May 17, 2019

(65) Prior Publication Data
US 2019/0359343 A1    Nov. 28, 2019

(30) Foreign Application Priority Data

May 22, 2018    (FR) ...................................... 1854213

(51) Int. Cl.
*B64D 29/06*    (2006.01)
*B64D 29/02*    (2006.01)

(52) U.S. Cl.
CPC ............. *B64D 29/06* (2013.01); *B64D 29/02* (2013.01)

(58) Field of Classification Search
CPC ......... B64D 29/06; B64D 29/08; B64D 29/00
See application file for complete search history.

(56) References Cited

U.S. PATENT DOCUMENTS

| 2,564,530 A * | 8/1951 | Albert .................... B64D 29/08 123/41.7 |
| 2011/0272533 A1 | 11/2011 | Bourdon |
| 2015/0110613 A1 | 4/2015 | Aten |

FOREIGN PATENT DOCUMENTS

| EP | 2862805 A1 | 4/2015 |
| FR | 2920141 A1 | 2/2009 |
| WO | 2014009616 A1 | 1/2014 |

OTHER PUBLICATIONS

French Search Report; priority document, dated Jan. 2019.

* cited by examiner

*Primary Examiner* — Alexander S Thomas
(74) *Attorney, Agent, or Firm* — Greer, Burns & Crain, Ltd.

(57) ABSTRACT

An aircraft has at least one cowling, a fixed structure, and a hinge system connecting the cowling to the fixed structure. The hinge system includes at least two hinges and at least two stops, including a first stop integral with the fixed structure and a second stop integral with the cowling, the first and second stops being configured to be in contact one against the other when the cowling is in the closed position and to ensure an absorption of a part of the loads between the cowling and the fixed structure at least along a direction perpendicular to the pivot axis of the hinge system.

7 Claims, 3 Drawing Sheets

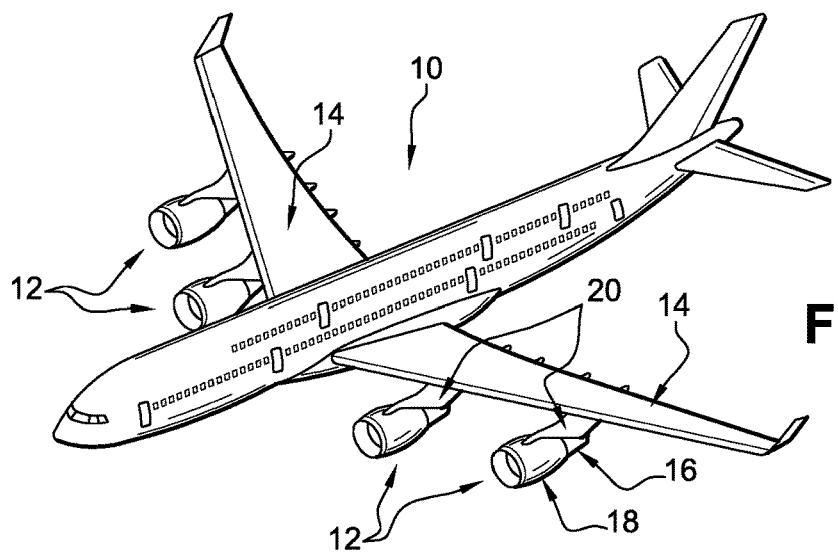
Fig. 1
Prior Art
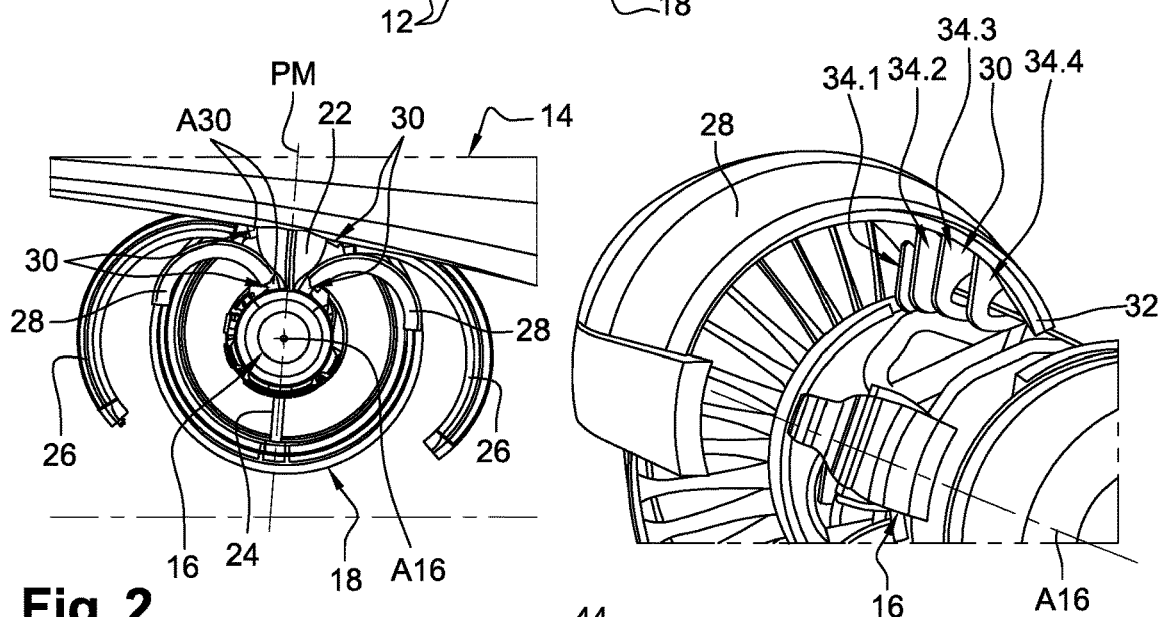
Fig. 2
Prior Art
Fig. 3
Prior Art
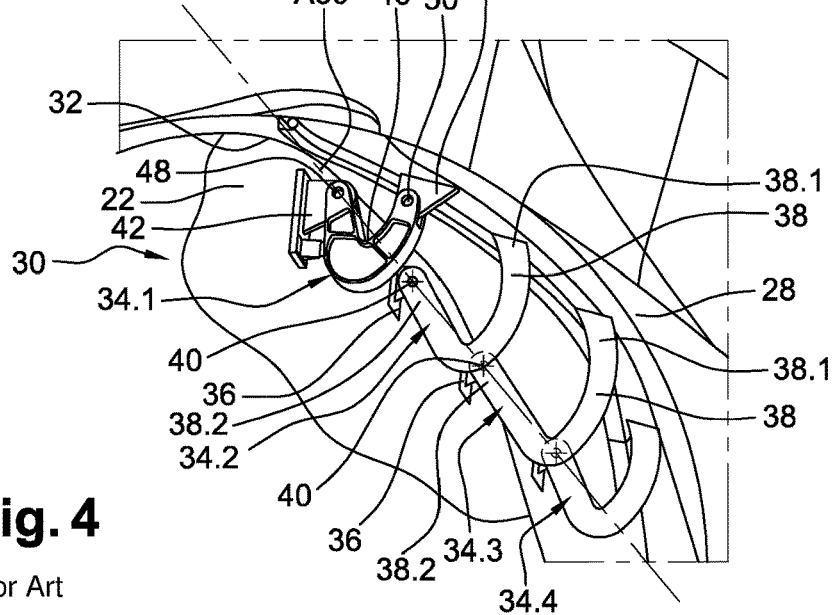
Fig. 4
Prior Art

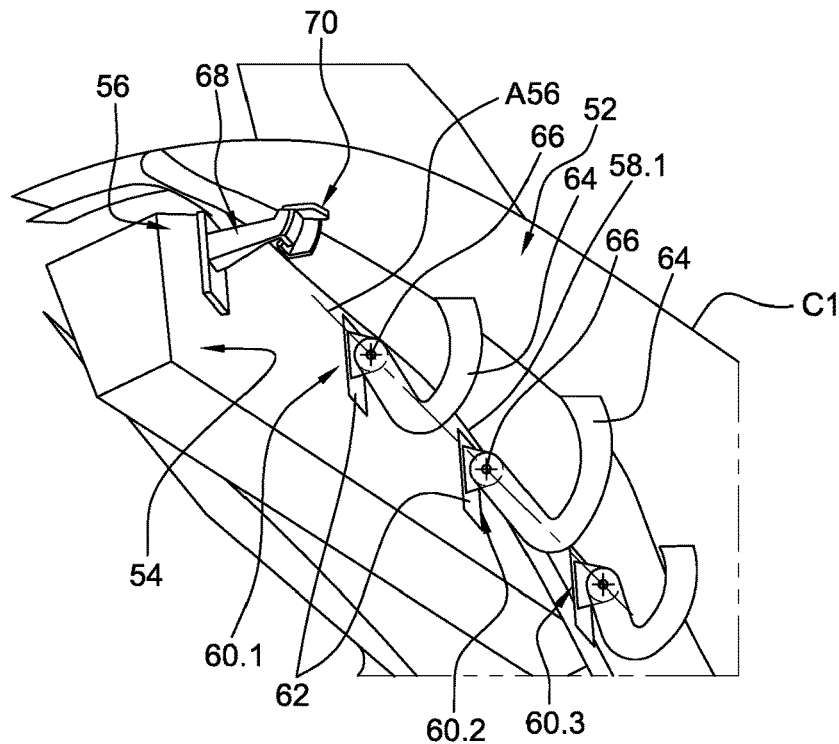
Fig. 5
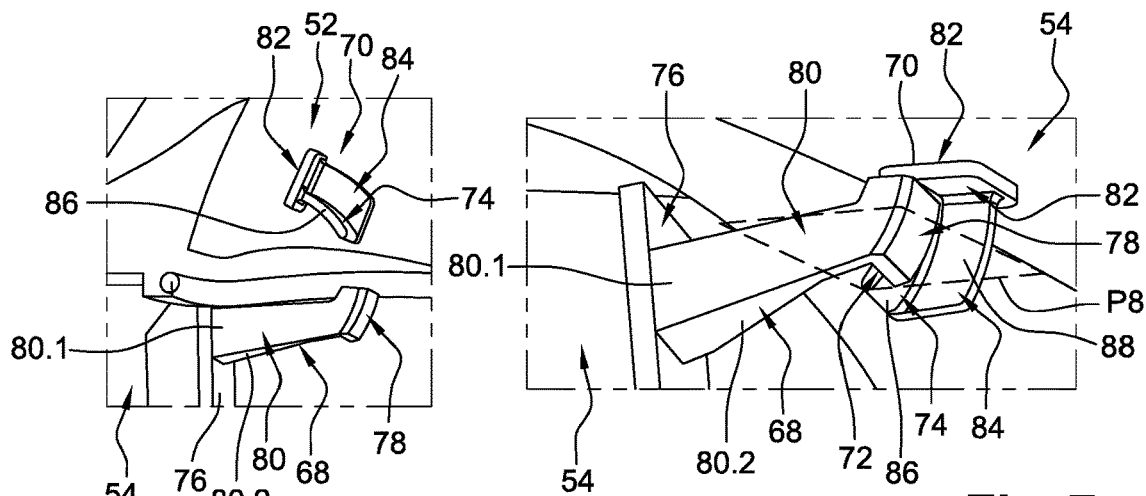
Fig. 6
Fig. 7
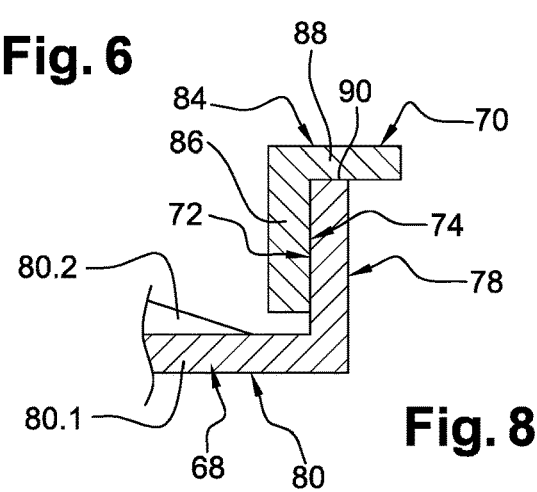
Fig. 8
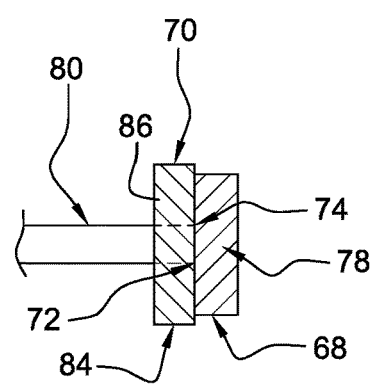
Fig. 9

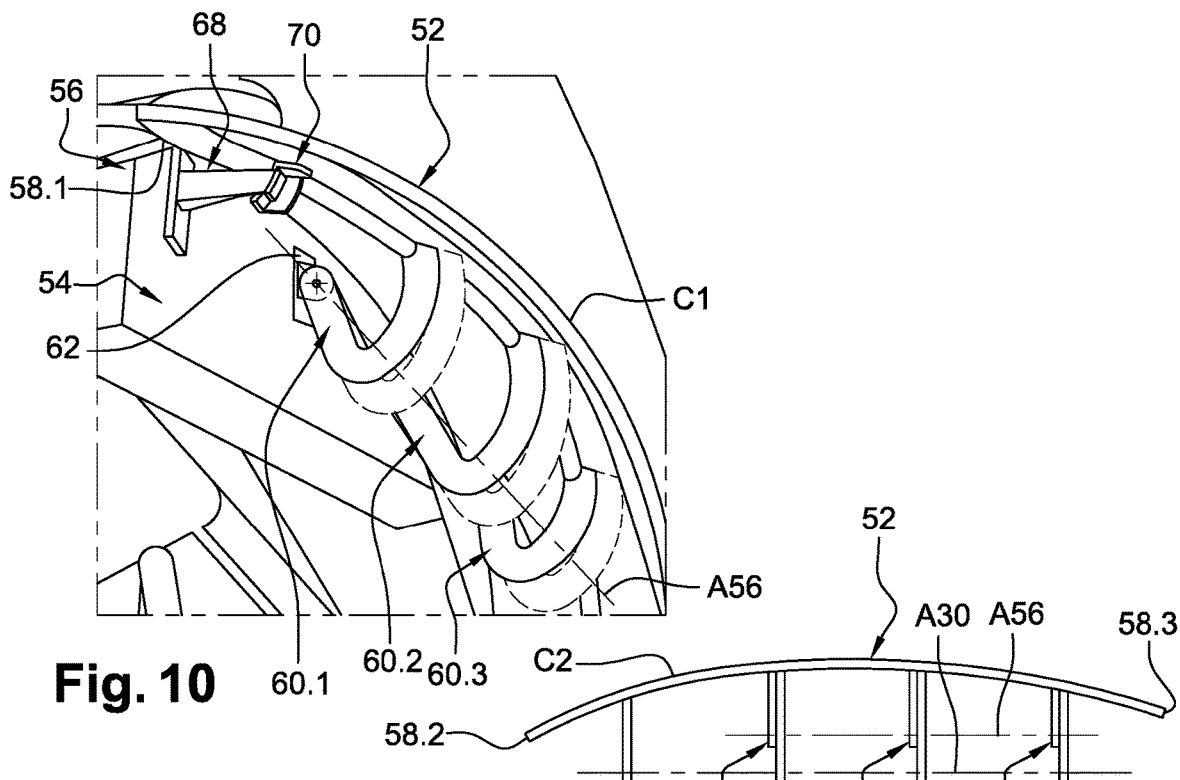
Fig. 10
Fig. 11
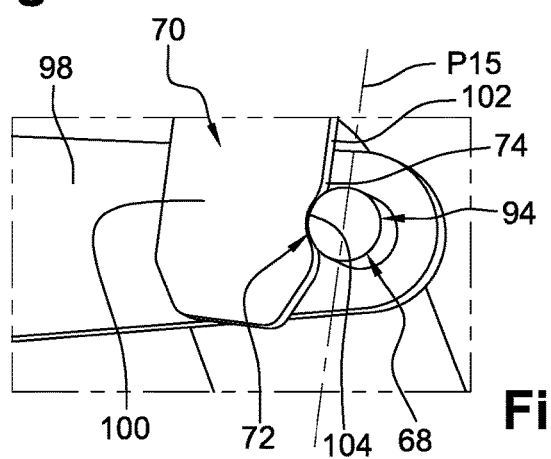
Fig. 12
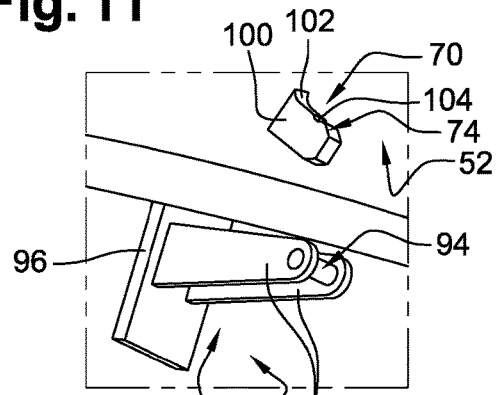
Fig. 13
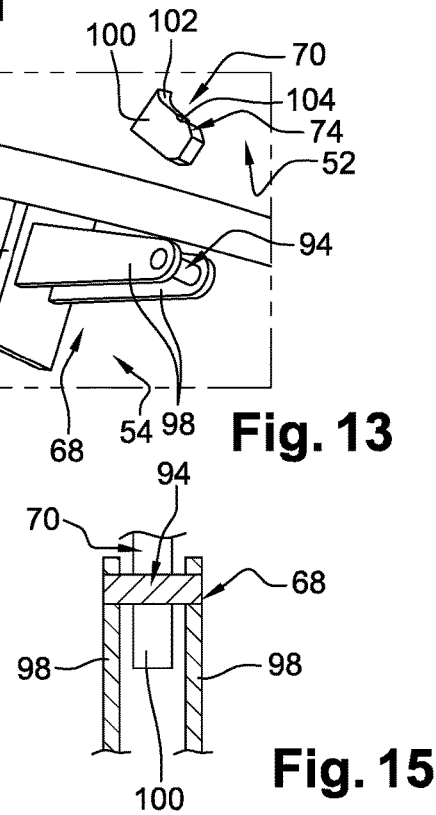
Fig. 14
Fig. 15

AIRCRAFT COMPRISING AT LEAST ONE COWLING EQUIPPED WITH AN IMPROVED HINGE SYSTEM

CROSS-REFERENCES TO RELATED APPLICATIONS

This application claims the benefit of the French patent application No. 1854213 filed on May 22, 2018, the entire disclosures of which are incorporated herein by way of reference.

FIELD OF THE INVENTION

The present application relates to an aircraft comprising at least one cowling equipped with an improved hinge system.

BACKGROUND OF THE INVENTION

According to a configuration visible on FIG. 1, an aircraft 10 comprises several engine assemblies 12 positioned under the wing 14.

As illustrated on FIGS. 1 and 2, an engine assembly 12 comprises:
an engine 16 in which a primary air flow circulates,
a nacelle 18 positioned around the engine 16 so as to delimit with same a circular duct in which a secondary air flow flows, and
a pylon 20 that ensures the connection between the engine 16 and the wing 14.

Upper and lower bifurcations 22, 24, positioned in a median plane PM passing through the engine axis A16, connect the nacelle 18 and the engine 16.

The engine 16 and the nacelle 18 each comprise at least one cowling 26, 28, mobile between an open position visible on FIG. 2 and a closed position visible on FIG. 1. The engine 16 and the nacelle 18 generally each comprise two cowlings 26, 28, disposed symmetrically relative to the median plane PM.

As illustrated on FIGS. 3 and 4, each engine assembly 12 comprises, for each cowling 26, 28, a hinge system 30 that connects a fastening edge 32 of the cowling and a fixed structure, like, for example, the upper bifurcation 22 or any other fixed part of the engine 16 or the nacelle 18. The hinge system 30 has a pivot axis A30 globally parallel to the engine axis A16.

Geometrically, the cowling 26, 28 has a first curve radius in a plane perpendicular to the engine axis A16 and a second curve radius in a plane passing through the engine axis A16.

According to an embodiment illustrated by FIGS. 3 and 4, the hinge system 30 comprises four hinges 34.1 to 34.4, spaced along the fastening edge 32. The number of hinges is determined, in particular, to ensure the absorption of the loads oriented along a direction perpendicular to the pivot axis A30 when the cowling 28 is in the closed position.

The second and third hinges 34.2 and 34.3, positioned between the first and fourth hinges 34.1, 34.4, each have a first part 36, integral with the fixed structure, as well as a second part 38, swan-necked in shape, which includes a first end 38.1, integral with the cowling 28, and a second end 38.2, connected to the first part 36 by at least one pivot shaft 40.

The first hinge 34.1 has a first part 42 integral with the fixed structure, a second part 44 integral with the cowling 26, 28, a third part 46, swan-necked in shape, interposed between the first and second parts 42, 44, a first pivot shaft 48 connecting the first part 42 and a first end of the third part 46, as well as a second pivot shaft 50 connecting the second part and a second end of the third part 46.

The fourth hinge 34.4 can be identical to the second and third hinges 34.2, 34.3 or to the first hinge 34.1, or it can be fully floating. Whatever its embodiment, the fourth hinge 34.4 comprises at least two parts, a first part integral with the fixed structure, a second part integral with the cowling 26, 28 as well as at least one pivot shaft connecting the parts in pairs.

Whatever the embodiment, each hinge comprises a swan neck shape allowing the spacing between the cowling and the fixed parts of the nacelle and of the engine to be increased when the cowling is in the open position.

In addition, the pivot shafts 40, 48, supported by the parts of the hinges integral with the fixed structure, are aligned as illustrated on FIG. 4.

On account of the swan neck shape and the alignment of the pivot shafts, the second and third hinges 34.2 and 34.3 are relatively encumbering when the cowling is in the closed position.

The present invention aims to remedy all or some of the disadvantages of the prior art.

SUMMARY OF THE INVENTION

For this purpose, an object of the invention is an aircraft comprising at least one cowling, a fixed structure that has an opening, a hinge system connecting the cowling to the fixed structure, said cowling being rotationally mobile around a pivot axis between a closed position in which the cowling masks the opening and an open position in which the cowling at least partially clears the opening, said hinge system including at least two hinges, each of which has at least two parts, with a first part integral with the fixed structure and a second part integral with the cowling, as well as at least one pivot shaft connecting the parts in pairs, one of the parts having a swan neck shape, the pivot shafts of the hinges being aligned and forming the pivot axis.

According to the invention, the hinge system comprises at least a couple of stops, that is, at least two stops, including a first stop integral with the fixed structure and a second stop integral with the cowling, the first and second stops being configured to be in contact one against the other when the cowling is in the closed position.

The couple of stops ensures the absorption of a part of the loads between the cowling and the fixed structure when the cowling is in the closed position. One of the hinges of the hinge system of the prior art (more particularly its swan neck shape) can thus be eliminated, which allows the encumbrance of the hinge system to be reduced.

According to other characteristics:
the couple of stops is positioned close to one of the side edges of the cowling.
the first and second stops are configured to be offset with respect to each other at least when the cowling is in the open position.
the first and second stops respectively include first and second contact surfaces, which are cylinder portions having a revolution axis merged with the pivot axis.
According to a first embodiment, the first stop comprises:
a panel fastened to the fixed structure,
a head that has a face oriented towards the panel forming the first contact surface, and
a body connecting the panel and the head;
and the second stop comprises at least a first flank, connected to the cowling, in the shape of a cylindrical plate that has an axis of revolution merged with the pivot axis and a face forming the second contact surface.

According to this first embodiment, the second stop comprises a second flank in the shape of a plate positioned in a plane perpendicular to the pivot axis, said second flank being configured to be in contact with an edge of the head of the first stop.

According to another embodiment, the first stop comprises a cylinder having a revolution axis parallel to the pivot axis, said cylinder being connected to the fixed structure and distanced from said fixed structure; and the second stop comprises a plate, connected to the cowling, positioned in a plane perpendicular to the pivot axis and having an edge configured to be in contact with the cylinder when the cowling is in the closed position.

According to another characteristic, the edge comprises a notch configured to accommodate partially the cylinder so as to immobilize the cowling in the closed position.

According to another characteristic, the first stop comprises a clevis having two flanks parallel to each other and perpendicular to the pivot axis, said flanks supporting the cylinder, the plate of the second stop being configured to be positioned between the two flanks when the cowling is in the closed position.

BRIEF DESCRIPTION OF THE DRAWINGS

Other characteristics and advantages will emerge from the description of the invention that will follow, which description is given only as an example, in the light of the attached drawings, among which:

FIG. 1 is a perspective view of an aircraft,

FIG. 2 is a rear view of an engine assembly including cowlings in the open position, FIG. 3 is a perspective view of a hinge system of a cowling that illustrates an embodiment of the prior art, FIG. 4 is a schematic representation of a hinge system of a cowling that illustrates the prior art, FIG. 5 is a schematic representation of a hinge system of a cowling that illustrates a first embodiment of the invention, FIG. 6 is a perspective view of a couple of stops of the hinge system visible on FIG. 5, the cowling being in the open position, FIG. 7 is a perspective view of the couple of stops of the hinge system, the cowling being in the closed position, FIG. 8 is a section along the plane P8 of FIG. 7, FIG. 9 is a section of a couple of stops of a hinge system of a cowling that illustrates a second embodiment, FIG. 10 is a schematic representation showing the differences between hinges of a hinge system of the prior art and hinges of the hinge system visible on FIG. 5, FIG. 11 is a schematic representation showing the differences between hinges of a hinge system of the prior art and hinges of the hinge system visible on FIG. 5, FIG. 12 is a perspective view of a couple of stops of a hinge system of a cowling that illustrates a third embodiment, the cowling being in the closed position, FIG. 13 is a perspective view of the couple of stops visible on FIG. 12, the cowling being in the open position, FIG. 14 is a section along the plane P1 of FIG. 12, and FIG. 15 is a section along the plane P15 of FIG. 14.

DETAILED DESCRIPTION OF THE PREFERRED EMBODIMENTS

FIGS. 5 and 10 show a cowling 52, a fixed structure 54 that has an opening as well as a hinge system 56 that connects the cowling 52 and the fixed structure 54.

The cowling 52 is thus rotationally mobile around a pivot axis A56 between a closed position in which the cowling 52 masks the opening and an open position in which it at least partially clears the opening, a fully open position corresponding to maximum opening of the cowling 52.

According to a configuration, the cowling 52 is a cowling of an aircraft engine or an aircraft nacelle, as illustrated on FIG. 2. The fixed structure 54 is an upper bifurcation of an aircraft engine assembly or any other fixed part of the nacelle or of the engine. The pivot axis A56 is globally parallel to the engine axis.

According to a configuration, the cowling 52 has a first curve C1 (visible on FIG. 10) in a plane perpendicular to a first direction that is approximately parallel to the pivot axis A56 and a second curve C2 (visible on FIG. 11) in a plane containing the pivot axis A56.

The cowling 52 has an upper edge (visible on FIGS. 5 and 11), hereafter called fastening edge 58.1, which extends from a first side edge 58.2 (approximately perpendicular to the pivot axis A56) to a second side edge 58.3 (approximately perpendicular to the pivot axis A56).

The hinge system 30 comprises at least two hinges 60.1, 60.2, each having at least two parts, a first part 62 integral with the fixed structure 54 and a second part 64 integral with the cowling 52, as well as at least one pivot shaft 66 connecting the parts in pairs, one of the parts having a swan neck shape. The pivot shafts 66 of the hinges 60.1, 60.2 are aligned and form the pivot axis A56 of the hinge system 56.

According to a configuration, the hinge system 56 comprises three hinges 60.1 to 60.3, which, apart from the positioning of their first parts 62, are identical to the second, third and fourth hinges of the hinge system of the prior art. The first parts 62 of these three hinges 60.1 to 60.3 are positioned, along a direction parallel to the pivot axis A56, in the same way as the second, third and fourth hinges of the hinge system of the prior art.

The hinge system 56 comprises at least a couple of stops 68, 70, a first stop 68 integral with the fixed structure 54 and a second stop 70 integral with the cowling 52, the first and second stops 68, 70 being configured to cooperate one against the other when the cowling 52 is in the closed position so as to immobilize the cowling 52 with respect to the fixed structure 54 at least along a direction perpendicular to the pivot axis A56. In the closed position, the couple of stops thus ensures the absorption of a part of the loads oriented along a direction perpendicular to the pivot axis A56 when the cowling is in the closed position, and prevents the cowling from opening due to an internal push.

The couple of stops 68, 70 is positioned close to one of the side edges of the cowling, in particular, close to the first side edge 58.2 closest to the engine axis, which allows the other hinges to be distanced from said side edge.

The first and second stops 68, 70 respectively have first and second contact surfaces 72, 74 configured to be in contact one against the other when the cowling 52 is in the closed position.

According to a configuration, the first and second stops 68, 70 are configured to be offset with respect to each other at least when the cowling is in fully open position, as illustrated on FIG. 6. In this position, the first and second contact surfaces 72, 74 no longer cooperate and are no longer in contact one against the other.

According to a first embodiment visible on FIGS. 5 to 8, the first and second contact surfaces are curved surfaces, and each correspond to a cylinder portion having a revolution axis merged with the pivot axis A56.

According to this first embodiment, the first stop 68 comprises:

a panel 76 including a plate fastened by any appropriate means to the fixed structure 54, a head 78 including a plate of which one face oriented towards the panel 76 forms the first contact surface 72, and a body 80 including a first end connected to the panel 76 and a second end connected to the head 78. The panel 76, the body 80 and the head 78 form just a single piece.

According to a configuration, the body 80 has an L shaped cross section and extends along a direction approximately perpendicular to the plate of the panel 76. The body 80 has a first flank 80.1, positioned in a plane perpendicular to the pivot axis A56 and a second flank 80.2, perpendicular to the first flank 80.1, triangular in shape, the base of the triangle being pressed against the panel 76, one apex of the triangle being oriented towards the head 78. The second flank 80.2 is distanced from the first contact surface 72 so as to allow the passage of the second stop 70, as illustrated on FIG. 8.

According to the first embodiment, the second stop 70 comprises:

a panel 82 including a plate fastened by any appropriate means to the cowling 52, a body 84, with an L shaped cross section, a first end of which is connected to the panel 82 and which has:

a first flank 86, in the shape of a cylindrical plate, which has a revolution axis merged with the pivot axis A56, and a face forming the second contact surface 74, and a second flank 88, in the shape of a plate, positioned in a plane perpendicular to the pivot axis A56.

When the cowling 52 is in the closed position, the first flank 86, positioned between the panel 76 and the head 78 of the first stop 68, is in contact with the head 78 of the first stop 68 and the second flank 88 is in contact with an edge 90 of the head 78 (visible on FIG. 8).

With the first flank 86 in contact with the head 78, the first and second stops 68, 70 are immobilized with respect to each other in translation along a direction approximately perpendicular to the pivot axis A56.

With the second flank 88 in contact with the edge 90 of the head 78, the first and second stops 68, 70 are immobilized with respect to each other in translation along a direction parallel to the pivot axis A56, in a single direction.

According to a second embodiment visible on FIG. 9, the body 84 of the second stop 70 only comprises one flank 86 in the shape of a cylindrical plate that has a revolution axis merged with the pivot axis A56 and a face forming the second contact surface 74.

Like for the first embodiment, when the cowling 52 is in the closed position, the first flank 86, positioned between the panel 76 and the head 78 of the first stop 68, is in contact with the head 78 of the first stop 68. The first and second stops 68, 70 are thus immobilized with respect to each other in translation along a direction approximately perpendicular to the pivot axis A56. Contrary to the first embodiment, the first and second stops 68, 70 are not immobilized with respect to each other in translation along a direction parallel to the pivot axis A56.

According to a third embodiment visible on FIGS. 12 to 15, the first stop 68 includes a clevis 92 and a cylinder 94 connected to the fixed structure 54 by the clevis 92, said cylinder 94 being distanced from the fixed structure 54. The clevis 92 comprises a panel 96 fastened by any appropriate means to the fixed structure 54 and two flanks 98 parallel to each other, perpendicular to the pivot axis A56 and connected by the cylinder 94, which has a revolution axis parallel to the pivot axis A56.

The cylinder 94 has an outer wall, a portion of which, oriented towards the panel 96, forms the first contact surface 72.

The second stop 70 comprises a plate 100, which has one end connected to the cowling 52 and which is positioned in a plane perpendicular to the pivot axis A56. The plate 100 has an edge 102 in contact with the cylinder 94 when the cowling 52 is in the closed position.

When the cowling 52 is in the closed position, the plate 100, positioned on the one hand between the panel 96 and the cylinder 94 of the first stop 68 and on the other hand between the two flanks 98 of the first stop 68, is in contact with the cylinder 94.

With the plate 100 in contact with the cylinder 94, the first and second stops 68, 70 are immobilized with respect to each other in translation along a direction approximately perpendicular to the pivot axis A56.

With the plate 100 positioned between the flanks 98 of the first stop 68, the first and second stops 68, 70 are immobilized with respect to each other in translation along a direction parallel to the pivot axis A56, in both directions.

According to a configuration, the edge 102 comprises a notch 104 configured to accommodate partially the cylinder 94. This notch, which is not deep, makes it possible to immobilize the cowling 52 in the closed position and limits the rotating motion of the cowling 52 around the pivot axis A56.

The invention procures the following advantages:

As illustrated on FIG. 11, with no hinge positioned close to the first side edge 58.2, the pivot axis A56 of the hinge system is disposed higher than the pivot axis A30 of the hinge system of the prior art. Consequently, as illustrated on FIG. 10, the lowest parts of the swan neck shapes of the hinges are positioned higher and are therefore less encumbering.

Furthermore, replacing the first hinge and therefore its swan neck shape with a couple of stops makes it possible to obtain a less encumbering hinge system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a cowling,
a fixed structure that has an opening,
a hinge system connecting the cowling to the fixed structure, said cowling being rotationally mobile around a pivot axis between a closed position in which the cowling masks the opening and an open position in which the cowling at least partially clears the opening, said hinge system comprising:
at least two hinges, each of which has at least two parts, with a first part integral with the fixed structure and a second part integral with the cowling, as well as at least one pivot shaft connecting the parts in pairs, one of the parts having a swan neck shape, the pivot shafts of the hinges being aligned and forming the pivot axis,
at least two stops, including a first stop integral with the fixed structure and a second stop integral with the cowling,
the first and second stops being configured to be in contact one against the other when the cowling is in the closed position, and
the first and second stops being configured to ensure an absorption of a part of the loads oriented along a direction perpendicular to the pivot axis when the cowling is in the closed position,
wherein the first and second stops respectively include first and second contact surfaces, which are cylinder portions having a revolution axis merged with the pivot axis.

2. The aircraft according to claim 1, wherein the at least two stops are positioned close to a side edge of the cowling.

3. The aircraft according to claim 1, wherein the first and second stops are configured to be offset with respect to each other at least when the cowling is in the open position.

4. The aircraft according to claim 1, wherein the first stop comprises a panel fastened to the fixed structure, a head having a face oriented towards the panel, forming the first contact surface, and a body connecting the panel and the head, and wherein the second stop comprises at least a first flank, connected to the cowling, in a shape of a cylindrical plate that has an axis of revolution merged with the pivot axis and a face forming the second contact surface.

5. The aircraft according to claim 4, wherein the second stop comprises a second flank having a plate shape, positioned in a plane perpendicular to the pivot axis, said second flank being configured to be in contact with an edge of the head of the first stop.

6. An engine for an aircraft, comprising:
A cowling,
a fixed structure that has an opening,
a hinge system connecting the cowling to the fixed structure, said cowling being rotationally mobile around a pivot axis between a closed position in which the cowling masks the opening and an open position in which the cowling at least partially clears the opening, said hinge system comprising:
two hinges, each of which has at least two parts, with a first part integral with the fixed structure and a second part integral with the cowling, as well as at least one pivot shaft connecting the parts in pairs, one of the parts having a swan neck shape, the pivot shafts of the hinges being aligned and forming the pivot axis,
two stops, including a first stop integral with the fixed structure and a second stop integral with the cowling,
the first and second stops being configured to be in contact one against the other when the cowling is in the closed position, and
the first and second stops being configured to ensure an absorption of a part of loads oriented along a direction perpendicular to the pivot axis when the cowling is in the closed position,
wherein the first and second stops respectively include first and second contact surfaces, which are cylinder portions having a revolution axis merged with the pivot axis.

7. A nacelle for an aircraft, comprising:
one cowling,
a fixed structure that has an opening,
a hinge system connecting the cowling to the fixed structure, said cowling being rotationally mobile around a pivot axis between a closed position in which the cowling masks the opening and an open position in which the cowling at least partially clears the opening, said hinge system comprising:
two hinges, each of which has two parts, with a first part integral with the fixed structure and a second part integral with the cowling, as well as a pivot shaft connecting the parts in pairs, one of the parts having a swan neck shape, the pivot shafts of the hinges being aligned and forming the pivot axis,
at least two stops, including a first stop integral with the fixed structure and a second stop integral with the cowling,
the first and second stops being configured to be in contact one against the other when the cowling is in the closed position, and
the first and second stops being configured to ensure an absorption of a part of loads oriented along a direction perpendicular to the pivot axis when the cowling is in the closed position,
wherein the first and second stops respectively include first and second contact surfaces, which are cylinder portions having a revolution axis merged with the pivot axis.

* * * * *